Patented Sept. 18, 1934

1,974,007

UNITED STATES PATENT OFFICE 1,974,007

TREATMENT SUBSTANCE

Heinrich Bertsch, Chemnitz, Germany, assignor to H. Th. Böhme Aktiengesellschaft, Chemnitz, Saxony, Germany, a company of Germany No Drawing. Application July 16, 1929, Serial No. 378,817. In Germany July 23, 1928

12 Claims. (Cl. 252—1)

As is well known, the sulphonation products of fats and oils and their carboxylic acids have emulsifying and wetting properties, by reason of which they are used in the form of Turkey red oils and other kindred preparations as emulsifiers, wetting and impregnating agents and the like.

The object of the present invention is to provide a class of substances which, in general, possess these properties in an even higher degree. Such are the esters of sulpho-fatty acids, which are formed by the addition of a molecule of sulphuric acid to the hydroxyl group of hydroxy-fatty acids or to the double linkage of unsaturated fatty acids. Depending upon the particular reagents and circumstances, the esterification may take place in the sulpho-group or in the carboxyl-group or at the same time in the sulpho-group and in the carboxyl group. Such in particular are the lower alkyl esters and the aryl esters of the fatty sulpho-acids which, over and above the properties referred to, have yet other characteristics which make them extremely valuable in industry. Thus, for instance they are also excellent foaming agents applicable to the treatment of silks.

These esters, namely the aryl esters and the lower alkyl esters derived from the lower monohydroxy alcohols such as butyl alcohol, up to cetyl alcohol, can be obtained by esterification of the fatty sulpho-acids or, better, by sulphonation of the fatty carboxylic acid esters, the alkyl or aryl group being transferred wholly or in part to the sulpho-group.

The esters or preparations therefrom by combination with sulphonated oils, aromatic sulpho-acids, soaps or fat solvents (hydrocarbons, chlorinated hydrocarbons and the like) are capable of wide application in the most varied branches of industry due to their above properties and, moreover, open up fresh industrial possibilities.

Thus in all forms of treatment of textile fibres with neutral, acid or alkali treatment liquids, they enhance the effect achieved by the materially increased wetting and impregnation by also converting fats, impurities, sizes and the like into aqueous dispersions. As additions in the production of pastes or dispersions of powders, for example, dyestuff powders, moreover, they facilitate wetting and solution thereof. For spinning purposes, their aqueous dispersions with or without further additions have proved to be valuable moistening agents. Similarly the action of treatment liquids in the manufacture and handling of leather is accelerated, strengthened and advantageously modified by the addition of the esters.

The esters are also capable of being used with advantage in the paper manufacturing and treating industry, in the manufacture of pigment colours and in the dyeing of furs wherever it is a question of the wetting, dispersion, penetration or conveyance of effective substances. Their properties also enable the esters to be used in pharmacy and in cosmetic prepartion as salves, creams, as substitutes for vasenols and the like.

Their efficacy as agents in the extermination of pests depends upon the same properties. The esters or mixtures containing the same are also suitable as additions to corrosions and as boring oils for metal. Furthermore they may be employed as dispersives of the nature of protective colloids, for instance in ink manufacture and fat-cleavage. Their penetrating properties can be utilized when they are used as additions to ceramic materials and their rapidly effective wetting powers make them useful as dust binding agents.

Four methods have proved feasible for the practical manufacture of these esters:

1. Sulpho-fatty acids produced according to known methods may be esterified with the monohydroxy alcohols:

2. The alkyl sulphuric acid may be first prepared from concentrated sulphuric acid and the alcohol and the fatty acid introduced into the same under appropriate conditions.

This method can be practiced without difficulty, the alkyl sulphuric acid produced by any of the methods already known being mixed with the acid in equimolecular proportions without alteration of the temperature conditions.

3. It has proved particularly simple and economical to carry out the addition of the sulphuric acid and the esterification in one operation. In this case the fatty acid is dissolved in the alcohol employed and the sulphuric acid then introduced.

4. The product may most advantageously be produced by slowly introducing 500 kgs. of 66° Bé. sulphuric acid into 360 kgs. of the butyl ester of ricinoleic acid at a temperature between 5 and 10° C. After all the sulphuric acid has been introduced, the reaction mixture is poured over ice and is then washed out with Glauber salt solution, the product being shaken up with the salt solution and settled. When the components have separated into two layers, the acid salt solution is separated as by decantation. The reaction product may then be neutralized by adding a solution of soda lye.

The fourth method above is disclosed in applicant's copending application, Serial No. 378,818, filed concurrently herewith, now issued into Patent 1,823,815.

In accordance with Method 1, the reaction proceeds as follows:

Ricinoleic acid

gives on sulphonation sulpho-ricinoleic acid,

esterification in the sulpho-group yields ricinoleic acid sulphuric monoester,

and esterification in both the sulpho- and carboxyl-groups yields ricinoleic acid sulphuric diester,

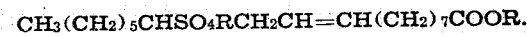

The corresponding esters of the sulpho-fatty acids with alcohol radicles of high molecular weight are in part more difficultly soluble, but also exhibit substantial wetting powers in, for instance, mixture with agents facilitating solution.

The instant application is a continuation-in-part of applicant's copending application Serial No. 368,195, filed June 3, 1929.

I claim:—

1. A wetting composition comprising an ester of a fatty sulpho-acid, the hydrocarbon radical of the ester being selected from the group consisting of aryl radicals or alkyl radicals having less carbon atoms than the cetyl radical.

2. A wetting composition comprising an aryl ester of a fatty sulpho-acid.

3. A wetting composition comprising an alkyl ester of a sulpho fatty ester, said alkyl radical having less carbon atoms than the cetyl radical.

4. A wetting agent comprising an ester of a fatty sulpho-acid, the hydrocarbon radicals of the ester being selected from the group consisting of aryl radicals or alkyl radicals having less carbon atoms than the cetyl radical, said alkyl or aryl radicals being joined at the carboxyl group and at the sulpho group.

5. A wetting agent comprising an ester of a fatty sulpho-acid, the hydrocarbon radical of the ester being selected from the group consisting of aryl radicals or alkyl radicals having less carbon atoms than the cetyl radical, said alkyl or aryl radical being joined only at the sulpho group.

6. A wetting agent comprising an aryl ester of a sulpho-fatty acid, said aryl radicals being joined at the carboxyl group and at the sulpho group.

7. A wetting agent comprising an aryl ester of a sulpho-fatty acid, said aryl radical being joined only at the sulpho group.

8. A wetting agent comprising an alkyl ester of a sulpho-fatty acid, said alkyl radicals having less carbon atoms than the cetyl radical and being joined at the carboxyl group and the sulpho group.

9. A wetting agent comprising an alkyl ester of a sulpho-fatty acid, said alkyl radical having less carbon atoms than the cetyl radical and being joined only at the sulpho group.

10. A wetting agent for the textile and allied industries comprising a sulpho-fatty acid esterified in the sulpho-group with an alcohol selected from the group consisting of aromatic and aliphatic monohydroxy alcohols.

11. A wetting agent for the textile and allied industries comprising a sulpho-fatty acid esterified in the sulpho and carboxyl groups with alcohol radicals selected from the group consisting of aromatic and aliphatic monohydroxy alcohols.

12. A wetting agent comprising an ester of a fatty sulpho-acid, the hydrocarbon radical of the ester being selected from the group consisting of aryl radicals or alkyl radicals having less carbon atoms than the cetyl radical, said alkyl or aryl radical being joined only at the carboxyl group.

HEINRICH BERTSCH.